D. E. SOMES.
APPARATUS FOR AND PROCESS OF REFRIGERATING, PRESERVING, AND VENTILATING.

No. 102,986.            Patented May 10, 1870.

Attest
F. Somes.
G. S. Palmer

Inventor
D. E. Somes

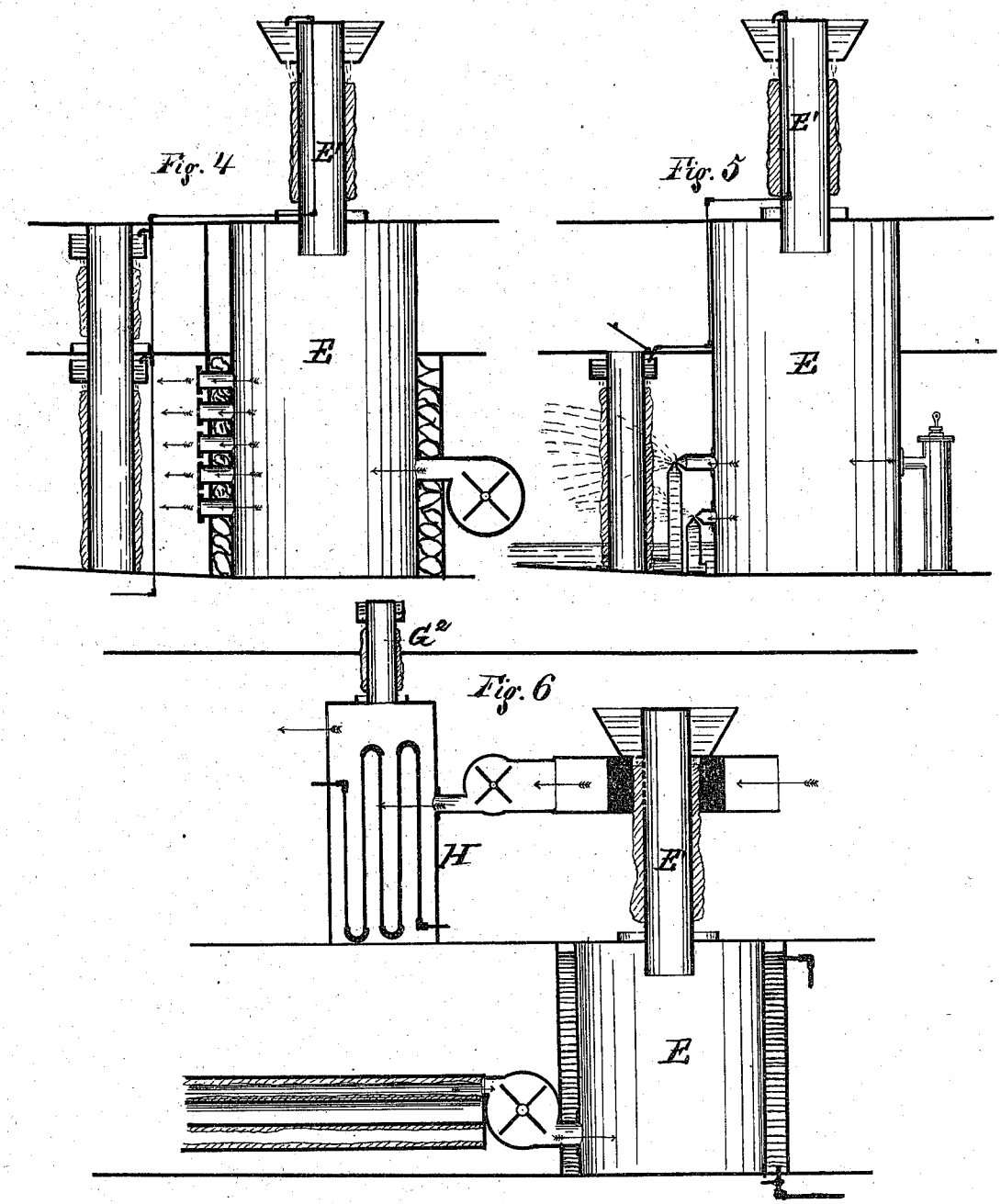

D. E. SOMES.
APPARATUS FOR AND PROCESS OF REFRIGERATING, PRESERVING, AND VENTILATING.

No. 102,986. Patented May 10, 1870.

Attest
F. Somes.
G. D. Palmer

Inventor
D. E. Somes

5 Sheets—Sheet 4.
D. E. SOMES.
APPARATUS FOR AND PROCESS OF REFRIGERATING, PRESERVING, AND VENTILATING.
No. 102,986.            Patented May 10, 1870.
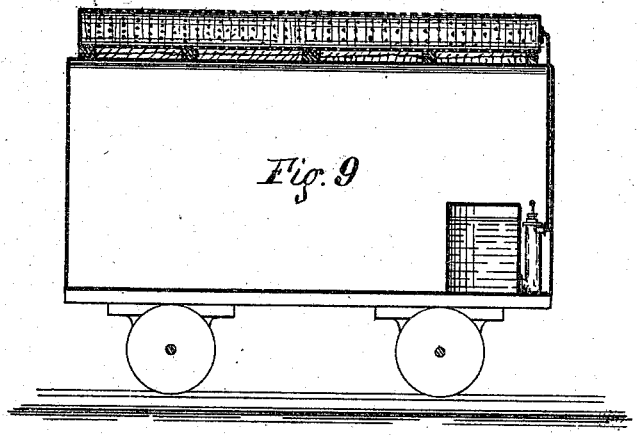
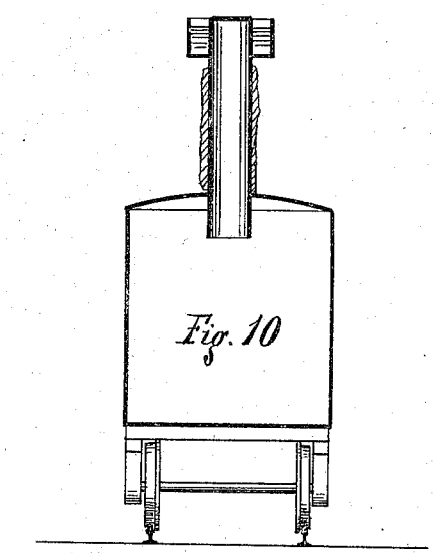

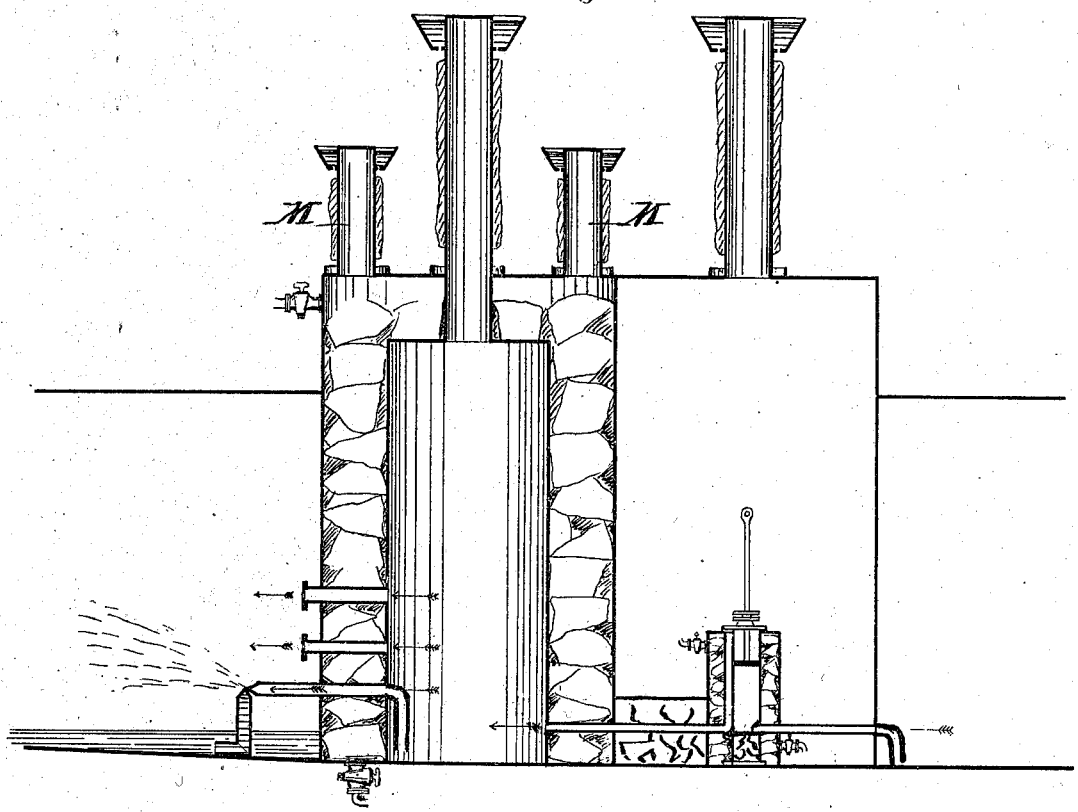

United States Patent Office.

DANIEL E. SOMES, OF WASHINGTON, DISTRICT OF COLUMBIA.

Letters Patent No. 102,986, dated May 10, 1870.

IMPROVEMENT IN APPARATUS AND PROCESS FOR REFRIGERATING, PRESERVING, AND VENTILATING.

The Schedule referred to in these Letters Patent and making part of the same

*To all whom it may concern:*

Be it known that I, DANIEL E. SOMES, of Washington, in the county of Washington and in the District of Columbia, have invented new and useful Improvements in Process and Apparatus for Making Ice, Preserving Food, and Ventilating Buildings; and I do hereby declare that the following is a full, clear, and exact description thereof, reference being had to the annexed drawings making part of this specification, in which—

Figure 4 is a vertical section of the air-compressing chamber, which, in this instance, is shown to be of cylindrical form, and into which air is blown by a blower, and from which the air is discharged through a series of tubes, the discharge-aperture of the tubes being contracted, so that the air or gas, on escaping in a somewhat compressed state, will suddenly expand in the cooling-chamber, containing volatile liquids, evaporators, ice-tanks, &c., and thus produce cold.

Figure 5 is a vertical section of an air-compressing chamber, similar in construction to the one shown in the preceding figure, a force-pump being substituted for the blower, so that the air, on escaping through the nozzled tubes, may possess enough force or velocity to cause it to create a vacuum in vertical tubes placed before them, in which the liquid in the bottom of the chamber will then rise and be thrown in a fine spray against a preserving-chamber.

Figure 6 is a vertical section, showing a cylindrical air-compressing chamber, into which air is blown by a blower, said blower drawing the air through a pipe, inclosing another pipe, both interior and exterior pipes being covered with fibrous material, the former upon its inner, the latter upon its outer surface, showing, also, an evaporating-tube upon the top of the chamber, with an annular air-conduit surrounding it, through which the air is drawn by a suction-blower, and thence discharged upon condensing-tubes, inclosed in a suitable chamber, which, in turn, may be mounted by another evaporating-tube.

Figure 1:
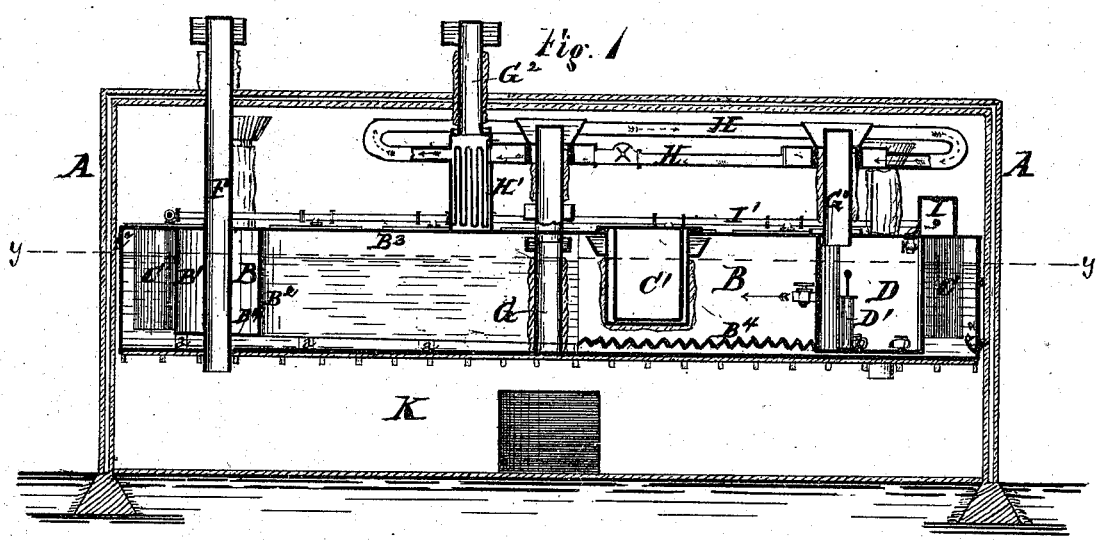
Figure 1 is a horizontal section on line *x x* of fig. 2.
Figure 2:
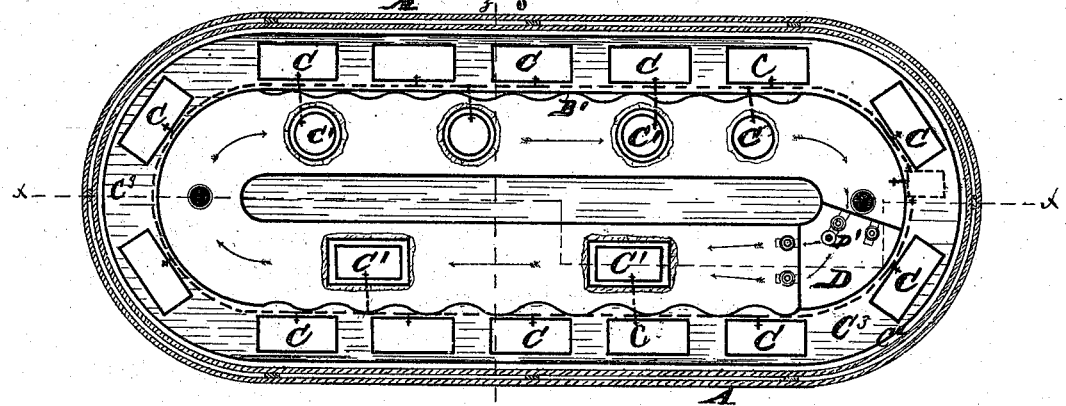
Figure 2 is a longitudinal vertical section on line *y y* of fig. 1.
Figure 3:
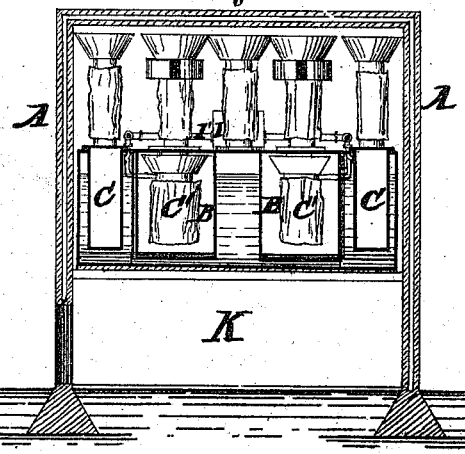
Figure 3 is a transverse vertical section on line *z z* of fig. 2.
Figure 7:
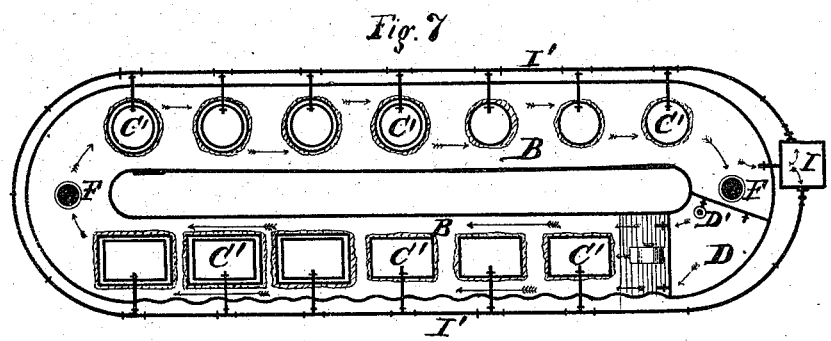

Figure 7 is a horizontal section of my improved apparatus, showing it apart from the surrounding tanks.

Figure 8:
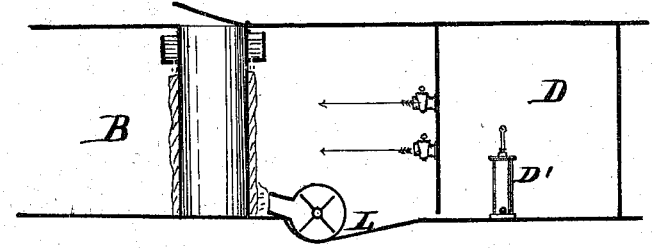

Figure 8 is a vertical section of a portion thereof, showing more particularly an arrangement of a suction-blower in a depression of the floor, so that such blower may draw in some of the liquid which may be used to cover the floor, and discharge it in a spray upon preserving-chambers suspended in the apparatus.

Figure 9 is a vertical longitudinal section of a railroad car, provided with a perforated tube, disposed horizontally upon its top, into which perforated tube water is forced by a pump from a tank in the car, and, flowing or spirting through its perforations, falls upon the roof of such car, which is covered with fibrous material, all being for the purpose of producing cold in the car by evaporation.

Figure 10 is a transverse vertical section of a railroad car, provided with a vertical evaporating-tube.

The same letters are used in all the figures in the designation of identical parts.

This invention relates to cooling air, cooling or freezing liquids and other substances, and to preserving animal and vegetable food, fruits, &c., and also to generating and using carbonic acid and other gases.

To enable those skilled in the art to make and use my invention, I will now proceed to describe its construction and operation.

First, cooling and freezing liquids, air, and other substances. This is accomplished, first, by passing through the liquid to be cooled, or around it, tubes, channels, or chambers, in which is forced or drawn common air, carbonic acid, or other gases.

Secondly, by forcing or drawing air or gas, or atomized or vaporized liquid or spray through tubes or channels, surrounded by the air, liquid, or other substance to be cooled, or against or around tubes, channels, chambers, or vessels, containing the air, liquid, or other substance to be cooled or frozen.

Thirdly, by compressing air or gas, and conducting therefrom the heat thereby produced, and then letting it suddenly expand and directing it against pipes, tanks, or other vessels containing air, gas, liquids, or other substances to be cooled.

Fourthly, by forcing air or gas against pipes, tanks, or other vessels covered with some fibrous, porous, or other suitable material, and wet or moistened by water, ether, ammonia, sulphuric acid, alcohol, spirits of turpentine, righolde, or any volatile liquid substance.

Fifthly, by conducting liquid to tubes or vessels, which may be placed above the roof, or at any convenient place outside of a building, car, ship, or other vessel, some of said tubes or vessels to be covered with fibrous material, against which currents of air are blown or drawn, causing evaporation and consequently producing cold in the various structures or vessels.

Sixth, generating carbonic-acid gas, and using it in the tanks or other vessels, to aid in the preservation of meats, fish, vegetables, fruits, and other articles. I also use it compressed, and allow it to expand in the cooling-chamber, which will reduce the temperature to a lower degree than air, when compressed and allowed to expand.

In the annexed drawings—

A represents a storied building, preferably constructed with multiple walls and roof, as shown.

In this instance the apparatus and machinery used for refrigerating and cooling are placed in the second and third stories, leaving the lower floor clear to be used or occupied for other purposes.

This arrangement may, of course, be departed from to suit any conditions which may make it desirable to do so.

The lower room may be employed as a preserving-room, or for the making of ice.

B is the cooling-chamber, of the form shown, or any other formed by the walls $B^1$ and $B^2$ and top $B^3$, and bottom or floor $B^4$, and arranged in the second story of the building.

This chamber is surrounded by an outer casing, $C^2$, inclosing a space, $C^3$, which is preferably filled with brine or other liquid which congeals at a lower temperature than the freezing-point of water, into which a series of tanks or chambers, C, is suspended, in which articles to be cooled, preserved, or refrigerated may be placed, and another series of similar tanks, $C^1$, is placed at suitable distances apart in the chamber B itself, the said tanks $C^1$ being, in most instances, covered with fibrous material, and provided with a reservoir around their upper ends, containing ether, water, or other liquid, to trickle down upon such fibrous covering.

Some of the chambers $C^1$ are not thus covered, and act as condensers to dry the air or gas just before it enters the pump or blower.

These tanks may be made so as to removable from the chamber B and space $C^3$, having flanges around their tops, from which to obtain support, and said flanges may rest upon rubber tubing, laid in grooves around the edge of the opening in the top of the casing or upon the flange itself, or both, so as to render the joints air-tight; or they may be made permanent in the machine, and water for being frozen be filled directly into them, or into smaller tanks set into the same and removable therefrom.

The room containing the pump or blower is marked D, and is divided off from the chamber B by partitions, so as to form an independent air-tight room.

The pump D' or blower draws the air from one end of the refrigerating-chamber B and forces it into the other end of said chamber, thus keeping up a continuous circulation of such air or gas.

When it is desired to compress the air or other gas, to lower its temperature, an air-compressing chamber, E, is used, either placed within the room D, or in the cooling-chamber B, it being made air-tight in its connections with said chambers, and provided with an evaporating-tube, $E^1$, for the purpose of conducting away the heat produced by compressing such air or gas.

The heat may be conducted from such chamber by a stream of water surrounding the same, or a packing of ice, ice and salt, or other cooling substances.

F F, &c., represent a number of evaporating-tubes, which may extend above the roof of the building, to be acted upon by the wind, and extend downward through the floors and the cooling-chamber B to the lower room, they being left open at top and bottom, and provided with valves in the usual manner, to serve for cooling and ventilating.

Above the roof and within the cooling-chamber, and at other points, they are covered with fibrous or porous material, and have reservoirs for liquid to be discharged upon such fibrous covering.

G represents another evaporating-tube, extending nearly to the bottom of the cooling-chamber B, and covered like the one just described, extending into the third story through another cooling air-chamber, soon to be described, so that the heat, on rising from the chamber B, may be again acted upon by another current of air.

This tube has reservoirs for liquid, as shown, and is incased in a suitable non-conducting box, between the two cooling-chambers.

$G^1$ represents another evaporating-tube, extending through the upper cooling-chamber, and down through the top of the lower one, to conduct the heat that rises above the lower ends of the tubes G, just described, having, of course, no evaporating apparatus attached to its lower end.

$G^2$ is still another evaporating-tube attached to the top of the condensing-chamber $H'$.

The liquid to be used in the reservoirs of the evaporating-tubes is conducted to them by pipes, and, wherever it is necessary, the different evaporating-tubes are provided with surrounding basins to catch the surplus or unevaporated liquid.

H is another continuous cooling-chamber, similar to the one B, provided with a blower or pump, to produce a continuous circulation of air or gas, directed against the evaporators, and against the pipes in the condensing-chamber $H'$, which, as already stated, is surmounted by an evaporating-tube, and incased in good non-conducting material.

I represents a retort, connected by pipes $I'$ and branch-pipes to the various tanks and cooling-chambers B and H, and preserving-chambers, such pipes being at suitable points provided with valves or cocks to regulate and direct the flow of the gas.

In this retort, chalk, marble-dust, and the like are placed, upon which sulphuric or other suitable acid is poured, whereby carbonic-acid gas is generated to be conducted where it may be wanted, or it may be generated as described in my patent No. 77,669.

The walls, or ceilings and floors of the cooling-chambers may be corrugated, or made irregular in any form, so as to present a greater cooling surface, and so that the depressions in the floor may contain a series of pools of the evaporating liquid and alternate ridges of the fibrous material over which the air or gas is forced, thus producing a greater degree of evaporation, and consequently a lower temperature than if floors and walls were smooth.

This apparatus is applicable to and is intended to be used in cars, ships, steamboats, and other vessels, the upper deck being represented by the roof of a building or car, and the cabin or other apartments of the ship by the various stories, as shown in the drawings.

The lower story K may be used as a packing or preserving-room, or a room for the manufacture of ice, receiving its cold air through the evaporating tubes F, and the air in said chamber is also made cold by contact with the bottom of the cooling-chamber B, when so desired.

When it is not intended to make ice in this room, the bottom of said chamber B is covered by wood, or some poor conductor, interposed between its metallic bottom and the air in the lower room.

The operation of this apparatus is as follows:

The ether, ammonia, or other volatile substance, is poured into the cooling-chamber in sufficient quantity to keep the fibrous coverings moist, and have a small quantity stand in the depressions. A blower is then started in one or more of the cooling-chambers B and H, which causes a continuous circulation of the air or gas, and throws the liquid from the depression L, fig. 8, in the floor against the tanks $C^1$ and evaporators G in the form of spray or mist, and also against the walls and floor.

The liquid thus parts with a portion of its latent heat, which rises through the evaporating tubes from one cooling-chamber to the other, and is extracted by the action of the evaporators, and carried into the open air or to the condensing-chamber. Near the other end of cooling-chambers B and H. the gas or air strikes against metal or tanks filled with ice, to condense its moisture, and causes it to enter the blower in a dry state, ready to repeat the operation.

The operation is thus continued until the liquid has parted with all its heat, and that which is contained in the water or other substance to be frozen. The temperature may be brought down many degrees below zero by using the force-pump, and compressing and expanding air or gas, and atomizing light volatile liquid, as herein described.

Ice is placed in some of the tanks C, as a reinforcement of cold, when the machinery is not in operation, and in some of those marked $C^1$ to aid in condensing the moisture in the gas in the refrigerating-chamber. In the latter case, the tanks so used are designed to be of metal, and are left without the fibrous or porous covering.

$a\ a$, &c., show supports or legs for the chamber B, which are made hollow and filled with ether or other volatile liquid, and, as the air or other gas is drawn or forced over them, said liquid rapidly evaporates and produces cold.

When I wish to keep the temperature a few degrees above the freezing-point for preserving purposes, or for salting meats, fish, &c., it is only necessary to use a blower and one refrigerating-chamber, with water therein as an evaporating fluid, or these may be dispensed with, and the evaporators in the open air, or the device shown in fig. 6, will suffice. If, however, the manufacture of ice is the object, ether or other very volatile fluid should be employed in the refrigerating-chamber, and force-pumps, with compressing-chambers, be substituted for the blowers.

What I claim as new, and desire to secure by Letters Patent, is—

1. The refrigerating-chamber B, blower or pump, and volatile liquid, in combination with the evaporators $C^1$, G, $G^1$, and $G^2$, substantially as described.

2. The refrigerating-chamber B, evaporators and blower or pump, in combination with the tanks C or $C^1$, substantially as and for the purposes described.

3. The gas-retort and conducting-pipes, in combination with the preserving-tanks C, substantially as described.

4. The gas-retort with conducting-pipe or pipes, in combination with the refrigerating-chamber B, blower or pump, and volatile liquid, substantially as described.

5. The refrigerating-chamber, having corrugated walls or floors, in combination with volatile liquid, substantially as and for the purpose set forth.

6. The refrigerating-chamber, lined with fibrous or porous material, in combination with volatile liquid, substantially as and for the purpose described.

7. Compressing fluid in one chamber, and allowing it to expand in another, in combination with evaporating devices, substantially as described.

8. The cooling and preserving room K, beneath the refrigerating-chamber B, in combination with the ventilating and evaporating-tube F, substantially as described.

9. In combination with the refrigerating-chamber B, the blower for forcing or drawing liquid or fluid, when set in a depression in the floor, substantially as and for the purpose set forth.

10. The compressing-chamber, surrounded by ice, water, or other cold substance, in combination with evaporators $S^4$, and blower or pump, substantially as described.

11. Refrigerating or cooling and ventilating cars by means of the apparatus or devices, substantially as herein described.

12. Refrigerating or cooling and ventilating ships, boats, and other vessels, by means of the apparatus or devices substantially as herein described.

D. E. SOMES.

Witnesses:
B. F. LLOYD,
F. C. SOMES.